(12) United States Patent
Jones et al.

(10) Patent No.: US 8,899,183 B1
(45) Date of Patent: Dec. 2, 2014

(54) CHILLED FOG INCUBATOR FOR FISH EGGS

(71) Applicants: Tod A. Jones, Astoria, OR (US); Roger Warren, Astoria, OR (US)

(72) Inventors: Tod A. Jones, Astoria, OR (US); Roger Warren, Astoria, OR (US)

( * ) Notice: Subject to any disclaimer, the term of this patent is extended or adjusted under 35 U.S.C. 154(b) by 0 days.

(21) Appl. No.: 13/891,065

(22) Filed: May 9, 2013

(51) Int. Cl.
*A01K 61/00* (2006.01)

(52) U.S. Cl.
CPC .................................... *A01K 61/008* (2013.01)
USPC ......................................................... 119/218

(58) Field of Classification Search
CPC .................................................. A01K 61/008
USPC ......... 119/218, 215, 216, 311, 312, 217, 246; 236/2, 4; 237/15
See application file for complete search history.

(56) References Cited

U.S. PATENT DOCUMENTS

| | | | |
|---|---|---|---|
| 3,269,578 A * | 8/1966 | Lewis | 220/4.25 |
| 4,159,009 A | 6/1979 | Friedman | |
| 4,606,299 A * | 8/1986 | Grumbach | 119/311 |
| 4,742,798 A | 5/1988 | Blackett | |
| 4,754,571 A * | 7/1988 | Riechmann | 47/59 R |
| 4,998,505 A | 3/1991 | Jordan | |
| 5,056,260 A * | 10/1991 | Sutton | 47/59 R |
| 5,156,111 A | 10/1992 | Heggelund | |
| 5,336,399 A * | 8/1994 | Kajisono | 210/170.02 |
| 5,833,137 A * | 11/1998 | Liao | 239/14.1 |
| 6,006,471 A * | 12/1999 | Sun | 47/69 |
| 6,036,633 A * | 3/2000 | Hodge | 600/22 |
| 7,819,084 B2 * | 10/2010 | Reusche et al. | 119/69.5 |
| 2003/0150394 A1 * | 8/2003 | Wolfe | 119/246 |
| 2011/0315783 A1 * | 12/2011 | Baker et al. | 236/3 |
| 2013/0323322 A1 * | 12/2013 | Gourley | 424/600 |

OTHER PUBLICATIONS

John W Bartok Jr, Mist and for Equipment for Propagation, 2009.*

* cited by examiner

*Primary Examiner* — Kristen C Hayes
(74) *Attorney, Agent, or Firm* — J. Curtis Edmondson; Law Offices of J. Curtis Edmondson

(57) ABSTRACT

A chilled fog incubator using ultrasonic disruption of water to maintain metabolite transfer for developing salomonid eggs, the incubator includes an incubation space, an air chamber, a sonication chamber, a control box having a pump, a chiller, a reservoir partition, a control switch panel, wheels, and specimen trays.

13 Claims, 2 Drawing Sheets

CHILLED FOG INCUBATOR FOR FISH EGGS

CROSS REFERENCE TO RELATED PATENT APPLICATIONS

The present application is a Non-Provisional of and claims the benefit of priority to U.S. Provisional application No. 61/644,818 filed on May 9, 2012. This disclosure is hereby incorporated by reference.

BACKGROUND

1. Field of the Invention

The invention relates to a closed water system incubator with sonication and at least one substrate platform. The invention further relates to the use of the incubator in the field of aquaculture as an effective means to avoid pathogens which reduce the productivity of commercial fish production.

2. Description of the Related Art

Due to the decline of natural salmon (Fam. Salmonidae) over the past 50 years, more and more salmonid species are kept in aquaculture to meet global demand. Effectively, on account of the proximity of the fish to one another in typical aquaculture settings, pathogenic fungi are on the rise, attacking both fish and fish eggs and the other stages of fish development.

Focusing more on fish eggs rather than adult fish and other stages of fish development, high concentrations of formalin (1000 to 2000 mg/l for 15 minutes) are typically used to control fungal infections on salmonid eggs. Formalin is considered an excellent fungicide for use in tanks and aquaria, but its use in ponds is discouraged because it chemically removes oxygen from the water. Nonetheless, a more natural approach to fish farming would not only avoid and alleviate disease-inducing factors, but also avoid the use of fungicides like formalin which are often associated with a number of risks, such as mutagenic and teratogenic potential.

Many salmonid egg incubation methods utilize conjoined cassette assemblies which can accommodate for example, about 2,500 Coho Salmon eggs. Known cassette assemblies are loaded with fertilized eggs and anchored in the stream gravel. Consequently, the assemblies are continually covered by the flow of the stream water passing through the gravel and the cassette cells. The problem with these types of incubation methods is the lack of control of the volume and temperature of the stream's water flow, plus they are subject to natural disasters such as flash flooding.

Accordingly, in the field of aquaculture and salmonid egg incubation, there is an increased need for an efficient means of avoiding and controlling fish pathogens without resorting to the use of chemical fungicides, while providing an overall incubation environment that can be carefully controlled, monitored and adjusted.

Incubators relevant to this disclosure are discussed in the following U.S. Patents, which are hereby incorporated by reference: U.S. Pat. Nos. 4,159,009; 4,742,798; 4,998,505; and 5,156,111.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Non-limiting embodiments of the present invention utilize chilled fog incubation via ultrasonic disruption of water to maintain metabolite transfer for the developing salomonid eggs.

Figure 1:
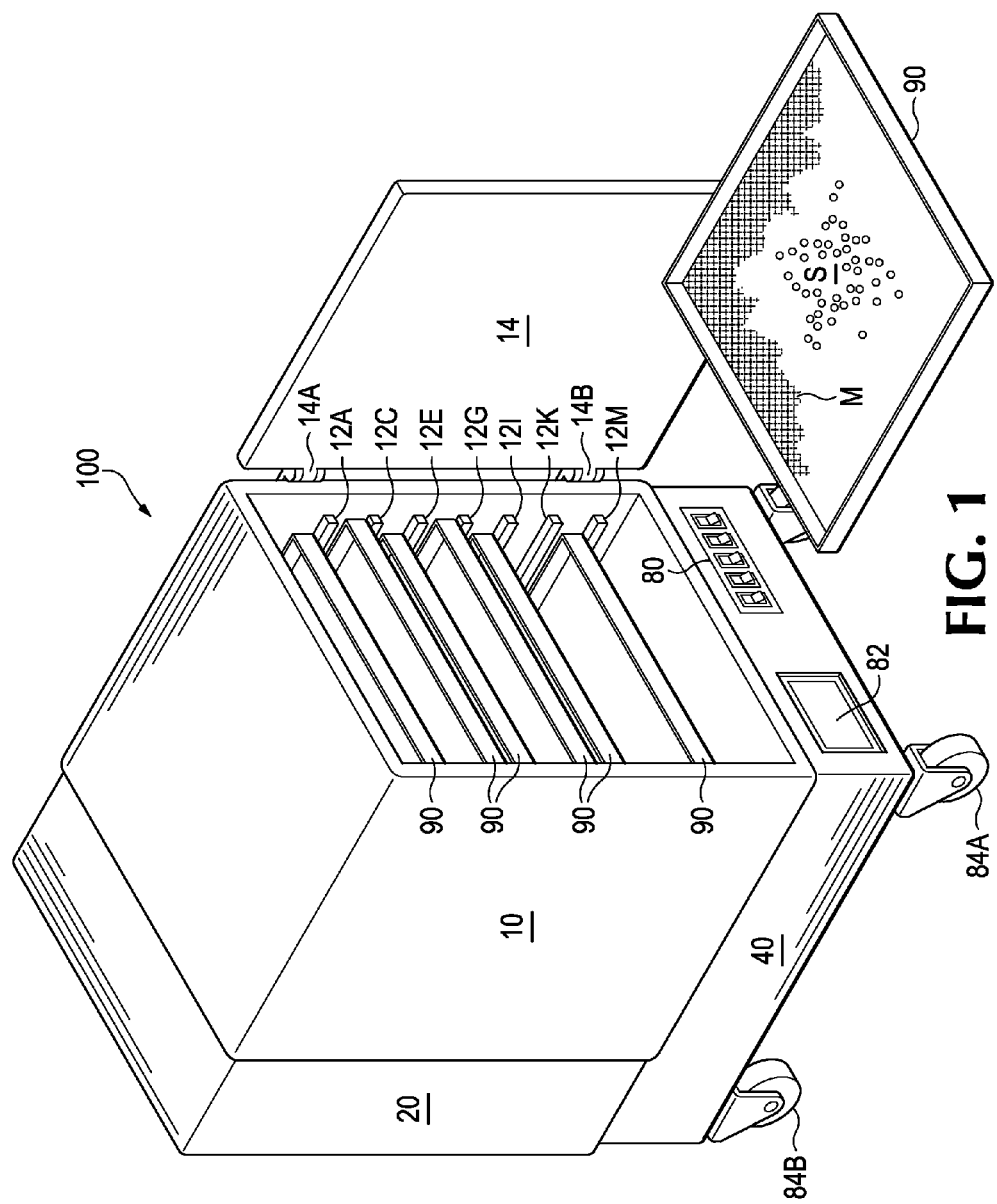
FIG. 1 is a perspective, top view of the incubator constructed according to the teachings of the present invention.
Figure 2:
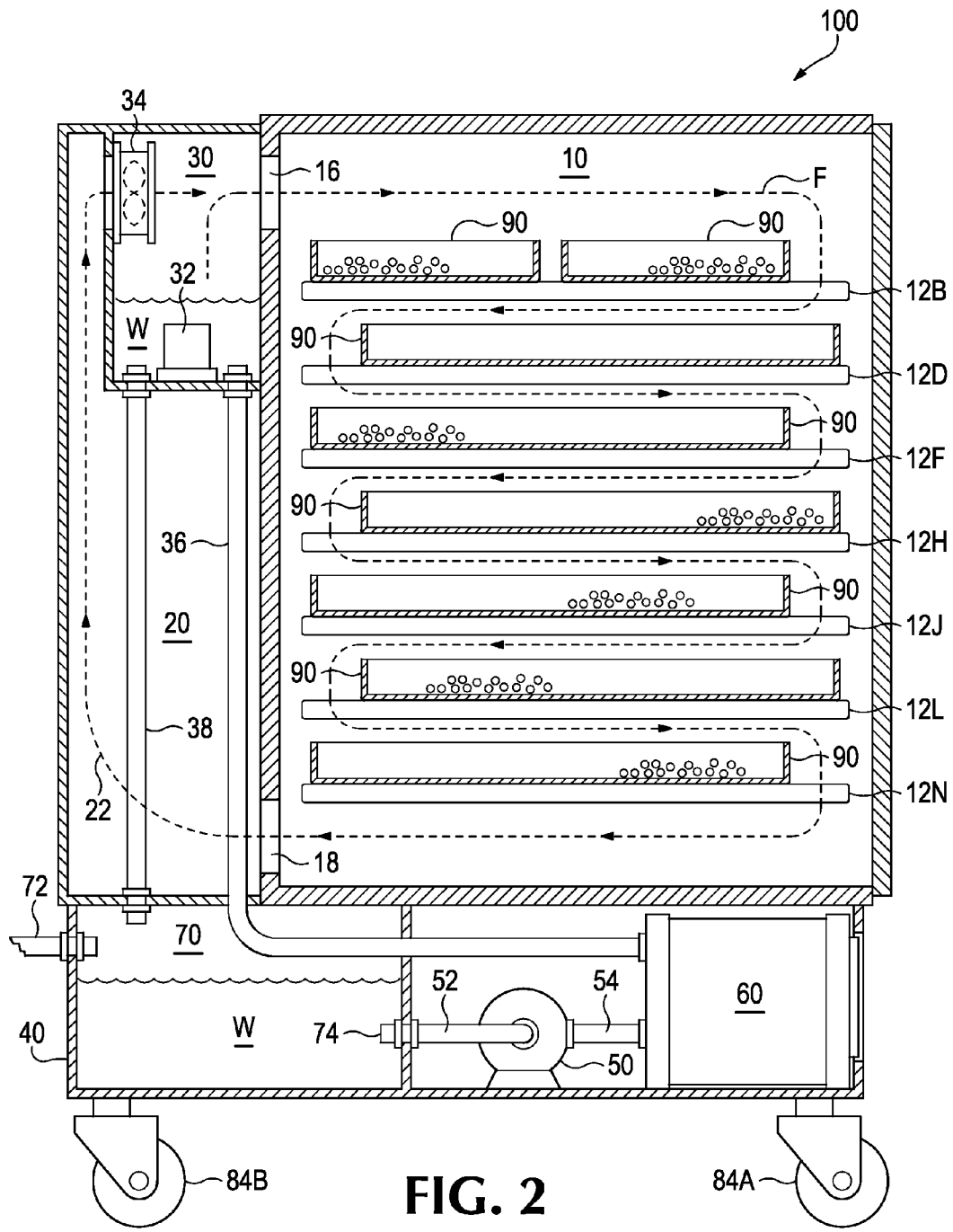
FIG. 2 is a side plan, cross-sectional view of the incubator shown in FIG. 1.

Referring to the drawings, wherein like reference numerals represent like parts throughout the various drawing figures, FIG. 1 and FIG. 2 are directed to a closed water system incubator 100 for providing a chilled fog flow F. The incubator 100 includes an incubation space 10, an air chamber 20, a sonication chamber 30 and a control box 40. The control box 40 includes a pump 50, a chiller 60, a reservoir partition 70, and a control/switch panel 80. The incubator 100 also includes removable substrate platforms or trays 90 for providing a resting place for the eggs S to grow.

With reference to FIG. 1, the chilled fog incubator 100 includes a closed walled incubation space 10. Those of skill in the art will understand that the incubation space 10 can be constructed from a highly insulated, suitable, rigid material that is durable, water-resistant, and relatively lightweight. Such materials include, but are not limited to, injection molded plastic with plastic foam, carbon fiber resin, or other metal or non-metallic alloy.

Referring to both FIG. 1 and FIG. 2, the incubation space 10 includes a number of pairs of tray rails 12 for sliding the trays 90 in and out of the incubation space 10. See tray rails 12 A, C, E, G, I, K and M in FIG. 1 and their counterparts 12 B, D, F, H, J, L and N in FIG. 2. Those of skill in the art will appreciate that the tray rails 12 are made of any suitable material that is contemplated as being within the spirit and scope of the invention.

In FIG. 1, incubation space 10, further includes a hinged door 14. The hinges 14 A, B of the door 14 provide frontal access to the trays 90 when inside the incubation space 10. Those of skill in the art will appreciate that other suitable doors and hinges are contemplated as being within the spirit and scope of the invention.

Referring to FIG. 2, fog inlet 16 and fog outlet 18 are ports located in the back wall of the incubation space 10. Fog inlet 16 and outlet 18 provide an entry and exit for the chilled fog flow F.

With continuing reference to FIGS. 1 and 2, the air chamber 20 is an enclosed four-walled chamber with a closed top and bottom. One wall of the air chamber 20 shares the back wall of the incubation space 10. Those of skill in the art will appreciate that the air chamber can be a partition of the incubation space 10, sharing a wall that includes the fog inlet 16 and fog outlet 18, or a separate chamber 30 within a chamber 20 that is mountable to the back wall of the incubation space 10 with the fog inlet 16 and fog outlet 18. There needs to be enough separation and space between the incubation space 10 and the sonication chamber 30 such that the heat exuded from the sonication chamber 30 does not affect the temperature controlled environment of the incubation space 10. After the chilled fog flow F exits the incubation space 10 at the fog outlet 18, the fog can be recycled as air 22 to flow back through the closed system.

Referring to FIG. 2, sonication chamber 30 is formed within the air chamber 20 by way of the upper corner of the air chamber 20. Access from the sonication chamber 30 to the incubation space 10 is through the fog inlet 16. An ultrasonic disruption unit 32 using ultrasound generated from a spring-loaded vibratory Teflon® membrane is submersed in water W and perched within the sonication chamber 30. Disposed above the water W level and ultrasonic disruption unit 32, a fan 34 is provided with access to the recycled air 22 within the air chamber 20. The water W level is regulated via water tube 36 and air tube 38. Water tube 36 connects to chiller 60 while air tube 38 connects to the reservoir partition 70.

In a non-limiting example of FIG. 2, the control box 40 is stationed underneath the incubation space 10 and air chamber 20. Within the control box 40, pump 50 is connected to the chiller 60 via tube 54 and connected to the reservoir partition 70 via tube 52. Chiller 60 is any known 15 horsepower chiller for use in aquariums. The reservoir 70 is filled with water W through water inlet 72. Water outlet 74 provides a passageway for the water W through tube 52 to the pump 50.

Those of skill in the art will appreciate that tubing 36, 38, 52, 54 and 72 is made of for example, PVC, STP, or weld tubing but any suitable material alternative is contemplated as being within the spirit and scope of the invention.

As shown in FIG. 1, the control box 40 also includes control/switch panel 80. The panel 80 provides control of the pump 50, chiller 60, ultrasonic disruption unit 32 and fan 34. The control box 40 may include hand access ports (not shown) to allow an operator to reach and replace the electrical components (not shown) for the features (e.g., 50, 60) that reside in the control box 40. A window 82 to allow sight access to the working components of the control box 40 is shown in FIG. 1. Wheels 84 A, B, C (partially shown) and D (not shown) are provided for mobility. Those of skill in the art will appreciate other suitable wheels and wheel designs and are contemplated as being within the spirit and scope of the invention.

Referring to both FIGS. 1 and 2, trays 90 are provided with a stainless steel mesh substrate M in which to place the eggs/specimens S. The trays 90 are adapted to fit inside the incubation space 10 via tray rails 12. Trays 90, by way of example can come in two sizes: smaller sized 12½ inches wide by 20 inches long and larger sized 18 inches wide by 26 inches long.

Various internal chamber dimensions of the incubation space 10 can be used to accommodate a salmonid egg S sample size. The incubator 100 may have more than one incubation space 10 depending on the needs of the hatchery or aquaculture setting. Generally, at least one transformer (not shown) is required for each incubation space 10 because a single transformer (not shown) is capable of powering the ultrasonic disruption unit 32 and the fan 34. Additional transformers (not shown) are thus necessary to power multiple ultrasonic disruption units 32 and fans 34 in each additional incubation space 10.

In use and operation and with reference to FIG. 2, the water supply W from the hatchery is channeled into partition 70 via water inlet 72. Pump 50 is then activated via the control/switch panel 80. The pump 50 circulates the water W through the chiller 60. The chiller 60 is capable of controlling the water W temperature to about 33 degrees Fahrenheit or 0.5 degrees Celsius. Once the pump 50 circulates the water W through the chiller 60, water W is then pumped through water tube 36 to the sonication chamber 30. The water W level in the sonication chamber 30 is regulated to keep the ultrasonic disruption unit 32 submerged. A vacuum is formed between the sonication chamber 30 and reservoir partition 70 such that the water W level in the sonication chamber 30 is not caused to overflow or not caused to become too low and expose the ultrasonic disruption unit 32 or any part of the ultrasonic disruption unit 32 above the water W level.

As illustrated in FIG. 2, fan 34 directs sonicated water and water vapor in the form of fog from the ultrasonic disruption unit 32 through fog inlet 16. The chilled fog then flows F in a serpentine pattern, acting as a natural pathogen deflector for the eggs S. The chilled fog flow F is achieved by spacing or staggering the trays 90 about 2 inches in alternating fashion from front to back. Fog particles within the fog flow F are about 1 micron in size, which is much less than lethal misting fog particles of 30 microns. The incubation space 10 becomes a moist environment that prevents metabolites from attacking the eggs S without the need for formalin or formaldehyde. This environment deters the formation and growth of mold or slime, as well. Water W condensing on the eggs S drips down off of the vertically disposed substrate platforms 90 into a drain tube (not shown) near the back wall of the incubation space 10 to prevent it from becoming re-circulated over the eggs S as chilled fog flow F.

With continuing reference to FIG. 2, the chilled fog flow F exits the incubation space at fog outlet 18 where it enters the air chamber 20 to be recycled into the fan 34. The incubator 100 is designed to use a small amount of water W. Hatcheries do not need a water line to use this incubator 100. Instead, rain water can be captured and channeled to the reservoir partition 70.

Using the power controls of the control/switch panel 80, the incubator 100 may be operated at ambient temperature without having the need to engage the chiller 60, especially in colder environments like Alaska. At the same time, the incubator's 100 portability (wheels 84) and compact size would allow it to be used in the corner of an office building.

In a non-limiting example, the incubator 100 may include a temperature controller (not shown). The incubator 100 can feature auto-programmable controls for temperature, time and electronics operations. Further, a digital read out measurement of the ambient temperature could be auto-programmed to dictate the need to auto-set the temperature within the incubation space 10. Also, a kill switch (not shown) that is able to interrupt or kill all power while sounding an alarm could be employed as a safety feature. Such controller automation could be actuated via the control/switch panel 80.

In another non-limiting example, salt water (not shown) may be used for incubation of crustaceans. Further, the incubator 100 could be miniaturized to be used in the shipping and packaging of crustaceans.

From the foregoing description it will be apparent that modifications can be made to the chilled fog incubator 100 without departing from the teachings of the invention.

The instant invention may be embodied in other forms or carried out in other ways without departing from the spirit or essential characteristics thereof. The present disclosure is therefore to be considered as in all respects illustrative and not restrictive, the scope of the invention being indicated by the appended claims, and all equivalency are intended to be embraced therein. One of ordinary skill in the art would be able to recognize equivalent embodiments of the instant invention and be able to practice such embodiments using the teaching of the instant disclosure and only routine experimentation.

What is claimed is:

1. An incubator used in aquaculture, comprising:

a housing having an incubation space disposed within the housing;

plural specimen substrate platforms vertically stacked in an alternating fashion within the incubation space, wherein the substrate platforms are staggered to alternate from a front side to a back side of the incubation space;

a chamber disposed outside of the incubation space and within the housing, the chamber comprising:
a liquid capable of being agitated by high frequency pressure sound waves;

an ultrasonic disruption unit, wherein the ultrasonic disruption unit is immersed in the liquid and provides high frequency pressure sound waves; and a fan disposed within the chamber.

2. The incubator of claim 1, wherein the incubation space and plural substrate platforms define a passageway for a fog flow having a serpentine flow path therein from an inlet to an outlet of the incubation space.

3. The incubator of claim 2, wherein the passageway fluidly connects the chamber to the incubation space.

4. The incubator of claim 3, wherein the inlet and the outlet are aligned in a vertical plane.

5. The incubator of claim 2, wherein the fan within the chamber directs the fog flow along the flow path from the inlet to the outlet within the incubation space.

6. The incubator of claim 5, wherein the fog flow further comprises fog particles, the fog particles are about 1 micron in size.

7. The incubator of claim 1, further comprising a pump.

8. The incubator of claim 1, further comprising an aquarium chiller.

9. The incubator of claim 1, wherein the liquid is water.

10. The incubator of claim 1, wherein the liquid is rain water.

11. The incubator of claim 1, wherein the plural specimen substrate platforms are removable from the incubation space.

12. The incubator of claim 1, wherein the incubator is mobile by way of push wheels.

13. A kit for incubation of fish eggs, the kit comprising:
an incubation space, wherein the incubation space further comprises a collection of one or more substrate platforms, the substrate platforms insertable into the incubation space;

a sonication chamber, wherein the sonication chamber produces a fog flow having fog particles sized to about 1 micron;

an air chamber;

a reservoir partition; and a chiller, wherein the incubation space and the substrate platforms define a passageway for the fog flow having a serpentine flow path therein.

* * * * *